United States Patent
Nakano et al.

(10) Patent No.: US 9,953,194 B2
(45) Date of Patent: Apr. 24, 2018

(54) INTERROGATION DEVICE, SYSTEM INCLUDING INTERROGATION DEVICE, AND PROGRAM

(71) Applicant: OMRON Corporation, Kyoto-shi, Kyoto (JP)

(72) Inventors: Yoshimitsu Nakano, Ritto (JP); Hidekatsu Nogami, Kusatsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/438,834

(22) Filed: Feb. 22, 2017

(65) Prior Publication Data

US 2017/0316232 A1 Nov. 2, 2017

(30) Foreign Application Priority Data

Apr. 28, 2016 (JP) .................................. 2016-091072

(51) Int. Cl.
*G08B 26/00* (2006.01)
*G06K 7/10* (2006.01)
*G06K 7/00* (2006.01)

(52) U.S. Cl.
CPC ....... *G06K 7/10217* (2013.01); *G06K 7/0008* (2013.01); *G06K 7/10009* (2013.01)

(58) Field of Classification Search
CPC ............ G08B 13/2465; G08B 13/2468; G08B 13/2488
USPC .................. 340/7.32, 733, 505, 13, 26, 7.33
See application file for complete search history.

(56) References Cited

U.S. PATENT DOCUMENTS

| 9,268,980 | B2* | 2/2016 | Tsuchida | G06K 7/10217 |
| 2013/0093569 | A1* | 4/2013 | Sano | G06K 7/10207 340/10.1 |
| 2013/0154801 | A1 | 6/2013 | O'Haire | |
| 2015/0035651 | A1 | 2/2015 | Tsuchida et al. | |

FOREIGN PATENT DOCUMENTS

| JP | 2000-049699 A | 2/2000 |
| JP | 2002-170082 A | 6/2002 |
| JP | 5798599 B2 | 10/2015 |

OTHER PUBLICATIONS

The extended European search report dated Sep. 8, 2017 in the counterpart European patent application.

* cited by examiner

*Primary Examiner* — Kevin Kim
(74) *Attorney, Agent, or Firm* — Metrolexis Law Group, PLLC

(57) ABSTRACT

An interrogation device includes an interrogation unit that interrogates an RF tag in a contactless manner, and a controller that controls the interrogation unit. The controller obtains a signal strength value and an interrogation success rate from a reception signal received by the interrogation unit when controlling the interrogation unit to transmit a signal with transmission power that is being changed in stages, determines changed transmission power corresponding to a signal strength value and an interrogation success rate that are not less than a threshold selectively from a signal strength value and an interrogation success rate obtained in each stage of the transmission power, and outputs information about the determined transmission power.

15 Claims, 14 Drawing Sheets

FIG. 15

| Transmission power | Measurement data (N sets) | | | |
|---|---|---|---|---|
| TX(1) | D(1) | D(2) | ••• | D(N) |
| TX(2) | D(1) | D(2) | ••• | D(N) |
| ⋮ | | ⋮ | | |
| TX(n) | D(1) | D(2) | ••• | D(N) |

Min ↑ ↓ Max

TBR, TBW

INTERROGATION DEVICE, SYSTEM INCLUDING INTERROGATION DEVICE, AND PROGRAM

This application claims priority from prior Japanese Patent Application No. 2016-091072 filed with the Japan Patent Office on Apr. 28, 2016, the entire contents of which are incorporated herein by reference.

FIELD

The present disclosure relates to an interrogation device that interrogates radio frequency (RF) tags in a contactless manner, a system including an interrogation device, and a program.

BACKGROUND

Short-range wireless communication techniques have been used in various fields to transmit and receive data in a contactless manner. Radio frequency identification (RFID) is a widespread, typical short-range wireless communication technique. A common RFID system includes an RF tag attached to a target object (hereafter, a workpiece) or an object such as a pallet or a container supporting or containing the target object, an interrogation device (hereafter, a reader/writer) that transmits and receives data to and from the RF tag, and a host device that controls the reader/writer.

An RFID system that uses an ultrahigh frequency (UHF) band has a relatively large range of interrogation distances of about 1 to 5 m between a reader/writer and an RF tag. This often causes the reader/writer to interrogate an RF tag that is not a target RF tag to be interrogated (hereafter, an unintended RF tag). To prevent this, the reader/writer is typically set to change the transmission power from its antenna and to adjust the range of its interrogation distance. This method optimizes (minimizes) the transmission power and thus prevents the reader/writer from interrogating an unintended RF tag.

However, adjusting the transmission power has been difficult for users without highly technical knowledge.

At an actual site where an RFID system is installed, interrogation signals from different reader/writers can interfere with one another depending on the distance between such reader/writers or depending on the number of reader/writers installed. A reader/writer installed at too large an interrogation distance may read an unintended RF tag located within the distance.

In response to these, Patent Literature 1 (Japanese Patent No. 5798599) describes a technique for adjusting the transmission power in accordance with the level of received power from an RF tag. Patent Literature 2 (Japanese Unexamined Patent Application Publication No. 2000-49699) describes a technique for first setting a maximum radio signal output level and then gradually lowering the output level while transmitting data to a peripheral device, and determining a minimum output level at which no error is detected in a response signal from the peripheral device. Patent Literature 3 (Japanese Unexamined Patent Application Publication No. 2002-170082) describes a method for switching the radio transmission power in accordance with the strength of a signal received from an integrated circuit (IC) card. In switching the transmission power, the degree of modulation is also changed in cooperation with the switching of the gain for amplifying the transmission power.

CITATION LIST

Patent Literature

Patent Literature 1: Japanese Patent No. 5798599
Patent Literature 2: Japanese Unexamined Patent Application Publication No. 2000-49699
Patent Literature 3: Japanese Unexamined Patent Application Publication No. 2002-170082

SUMMARY

Technical Problem

With the methods described in Patent Literatures 1 and 3, the transmission power is adjusted based on the level of the received power. However, the use of the received power level alone cannot optimize the transmission power that stabilizes the interrogation with an RF tag. Further, the sufficiently high received power level can equate to a low reading rate, depending on the type of an RF tag or the environment in which the RFID system is installed. The received power level may be unchanged after reaching a certain level. In this case, the transmission power is set to the maximum output.

As one technique associated with Patent Literature 1, adjusting the transmission power in accordance with the reading rate of an RF tag has been developed. The reading rate referred to herein is determined based on the number of successful interrogations within a predetermined time, the number of consecutive successful interrogations, and the number of failed interrogations.

A successful interrogation refers to normal reception of a response from a target RF tag by a reader/writer after the reader/writer transmits a command to the target RF tag. A failed interrogation refers to abnormal reception of a response from a target RF tag by the reader/writer after the reader/writer transmits a command to the target RF tag.

When the transmission power is adjusted in accordance with the reading rate, the use of the reading rate alone cannot determine the optimum transmission power for stable interrogation with an RF tag. Further, when the level of received power is near the lowest reception sensitivity and has no margin for interrogation, the use of a sufficiently high reading rate cannot enable stable interrogation, depending on the type of an RF tag or the surrounding environment. The interrogation margin herein refers to information about whether stable interrogation is achievable.

The demand is increasing for a simple structure that determines the transmission power that creates a larger margin.

Solution to Problem

An interrogation device according to one aspect includes an interrogation unit that interrogates an RF tag in a contactless manner, and a controller that controls the interrogation unit. The controller obtains a signal strength value and an interrogation success rate from a reception signal received by the interrogation unit when controlling the interrogation unit to transmit a signal with transmission power that is being changed in stages, determines changed transmission power corresponding to a signal strength value and an interrogation success rate that are not less than a threshold selectively from a signal strength value and an interrogation success rate obtained in each stage of the transmission power, and outputs information about the determined transmission power.

The interrogation device thus determines the transmission power corresponding to the signal strength value and the interrogation success rate that are not less than the threshold for creating a larger margin.

In some embodiments, the controller changes the transmission power for the interrogation unit between a predetermined minimum transmission power and a predetermined maximum transmission power.

The interrogation device simply changes the transmission power between the predetermined minimum transmission power and the predetermined maximum transmission power.

In some embodiments, when the transmission power for the interrogation unit is changed to the maximum transmission power, the controller outputs a warning upon obtaining an interrogation success rate that is less than the threshold.

The interrogation device outputs a warning for a destabilizing factor when the interrogation success rate is as low as less than the threshold, although the transmission power is increased to the maximum transmission power.

In some embodiments, when the transmission power for the interrogation unit is changed between the minimum transmission power and the maximum transmission power, the controller outputs a warning upon obtaining an interrogation success rate that has changed by a degree falling within a predetermined range.

The interrogation device outputs a warning for a destabilizing factor when the change in the interrogation success rate is small, although the transmission power is increased to the maximum transmission power.

In some embodiments, the interrogation device further includes an antenna unit, and a power filter that cuts a reception signal with power that is less than a filter threshold selectively from reception signals output from the antenna unit. The controller determines reception power of a received signal as the filter threshold for the power filter.

The interrogation device excludes an RF tag for which the reception power is less than the filter threshold from its interrogation target.

In some embodiments, the interrogation unit has a plurality of channels for interrogation, and the controller determines the transmission power for each channel while switching the channels for interrogation to be performed by the interrogation unit.

The interrogation device determines the transmission power for each channel.

In some embodiments, the interrogation unit separately interrogates a plurality of RF tags that are located at different positions. The controller determines the transmission power for each RF tag while switching the RF tags to be interrogated by the interrogation unit.

The interrogation device determines the transmission power that enables interrogation with all the plurality of RF tags.

In some embodiments, the interrogation success rate includes a reading success rate indicating a rate of successful reading of data from the RF tag, and a writing success rate indicating a rate of successful writing of data to the RF tag. The controller further determines changed transmission power corresponding to a signal strength value and a reading success rate that are not less than a threshold selectively from a signal strength value and a reading rate obtained in each stage of the transmission power, determines changed transmission power corresponding to a signal strength value and a writing success rate that are not less than a threshold selectively from a signal strength value and a writing rate obtained in each stage of the transmission power, and stores the determined transmission power corresponding to the reading success rate as the transmission power for a reading process in a working mode, and stores the determined transmission power corresponding to the writing success rate as the transmission power for a writing process in the working mode.

The interrogation device automatically sets the transmission power adjusted separately for the data reading process and for the data writing process.

A system according to another aspect includes an interrogation device and a host device. The interrogation device includes an interrogation unit that interrogates an RF tag in a contactless manner, and a controller that controls the interrogation unit. The controller obtains a signal strength value and an interrogation success rate from a reception signal received by the interrogation unit when controlling the interrogation unit to transmit a signal with transmission power that is being changed in stages, determines changed transmission power corresponding to a signal strength value and an interrogation success rate that are not less than a threshold selectively from a signal strength value and an interrogation success rate obtained in each stage of the transmission power, and outputs information about the determined transmission power.

A program according to still another aspect enables an interrogation device to implement an interrogation method. The interrogation device includes an interrogation unit that interrogates an RF tag in a contactless manner, and a processor. The program enables the possessor to implement obtaining a signal strength value and an interrogation success rate from a reception signal received by the interrogation unit when controlling the interrogation unit to transmit a signal with transmission power that is being changed in stages, determining changed transmission power corresponding to a signal strength value and an interrogation success rate that are not less than a threshold selectively from a signal strength value and an interrogation success rate obtained in each stage of the transmission power, and outputting information about the determined transmission power.

Advantageous Effects

The simple structure of the embodiments determines transmission power that creates a large margin.

BRIEF DESCRIPTION OF THE DRAWINGS

FIG. 15 is a schematic diagram showing measurement data according to another embodiment.

DETAILED DESCRIPTION

Figure 1:
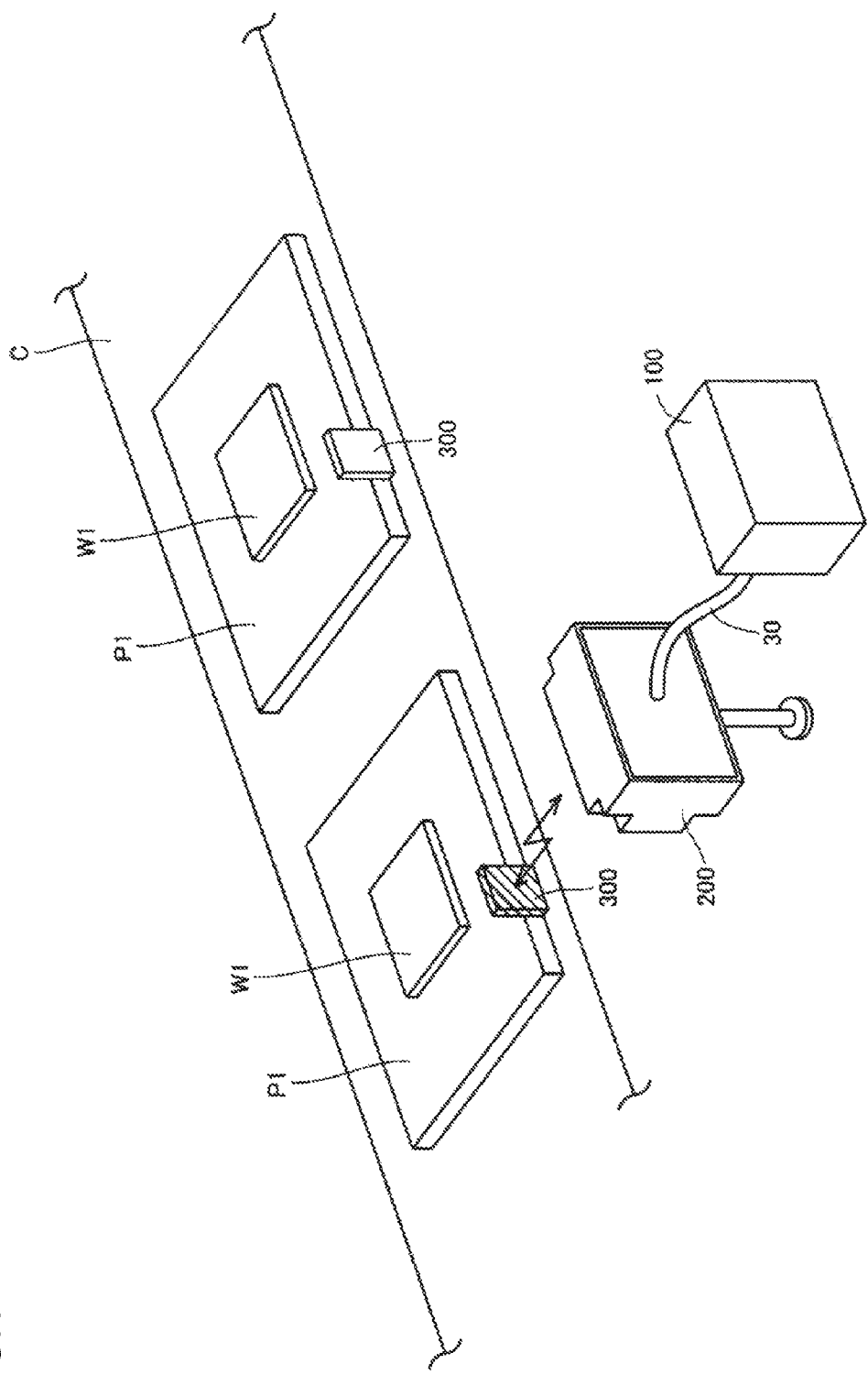
FIG. 1 is a schematic diagram showing the configuration of an RFID system installed at a production line of a factory according to an embodiment.

Embodiments of the present invention will now be described in detail with reference to the drawings. The same or corresponding components in the figures are given the same reference numerals, and will not be described redundantly.

A radio frequency identification (RFID) system will now be described as a typical example of a system including an interrogation device that performs short-range wireless communication. In a common RFID system, an interrogation device is often referred to as a reader/writer as described above to indicate its functions. The interrogation device herein is also referred to as a reader/writer. The interrogation device may not have both the function of reading data from an RF tag (reader function) and the function of writing data to an RF tag (writer function), and may have at least one of the two functions.

Although the above RF tag may also be commonly called an IC tag or an RFID tag, the term RF tag will be used herein.

Integration herein refers to communication between the reader/writer and an RF tag. An interrogation process refers to the processing performed for interrogation by the reader/writer. Interrogation includes transmission and reception of commands associated with the reader function or the writer function, and also includes transmission and reception of data associated with the reader function or the writer function.

Although RFID is a typical example of short-range wireless communication, any other schemes developed based on the RFID technique can fall within the technical scope of the invention. Although communication based on RFID uses signals in the ultrahigh frequency (UHF) band in the embodiments, signals in other signal bands can also fall within the technical scope of the invention.

Overview

The reader/writer according to the present embodiment has operation modes including a working mode and a test mode. The operation modes of the reader/writer are switchable. In the working mode, the reader/writer interrogates an RF tag attached to a workpiece that is either moving or is stationary during operation of, for example, a production line of a factory.

In the test mode, which is a non-working mode, for example, the production line is stopped. As a result, the reader/writer determines and sets the transmission power that creates a larger margin as described above while interrogating an RF tag that is stationary on the production line.

The transmission power determined in the test mode is set in an interrogation unit included in the reader/writer in the working mode. The reader/writer can thus perform interrogation with a large margin.

Overview of System Configuration

FIG. 1 is a schematic diagram showing the configuration of an RFID system installed at a production line of a factory according to the embodiment. As shown in FIG. 1, the RFID system includes a plurality of RF tags 300, a reader/writer 200, and a device 100, which is a host device such as a personal computer or a programmable logic controller. Each RF tag 300 is attached to a pallet P1, which supports a workpiece W1.

In the working mode, the reader/writer 200 interrogates a target RF tag 300 while each workpiece W1 on the pallet P1 with an RF tag 300 is being transported on a belt conveyor C. The reader/writer 200 writes or reads information to or from the target RF tag 300.

The reader/writer 200 includes an antenna, which is selected from different antennas with different circuit characteristics, and an interrogation controller, which is commonly used for various models. The reader/writer 200 is connected to the device 100 with a cable 30. The reader/writer 200 may be connected wirelessly to the device 100, instead of using the cable 30.

The reader/writer 200 is installed near the conveyor C. When a pallet P1 enters an interrogation zone in which the reader/writer 200 can interrogate an RF tag 300, the reader/writer 200 starts interrogating the RF tag 300. This interrogation process includes an ID reading process for identifying an RF tag 300 (hereafter, a target RF tag 300), and a read/write process performed using the reader function or the writer function.

Configuration of Device 100

Figure 2:
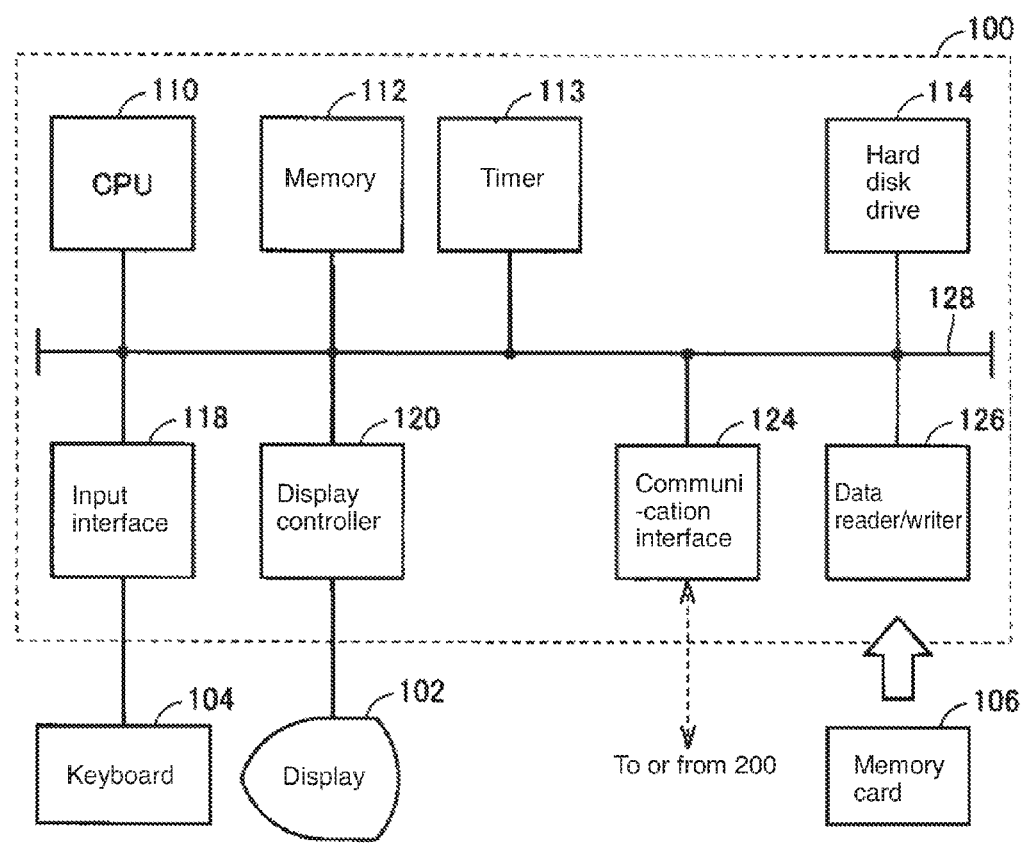
FIG. 2 is a schematic block diagram of a device 100 according to the embodiment.

FIG. 2 is a schematic block diagram of the device 100 according to the embodiment. Referring to FIG. 2, the device 100 includes a central processing unit (CPU) 110, which is responsible for computation, a memory 112 and a hard disk drive 114 as its storage units, a timer 113, which keeps time and outputs timing data to the CPU 110, an input interface 118, a display controller 120, a communication interface 124, and a data reader/writer 126. These components are connected to one another with a bus 128 to allow data communication between them.

The CPU 110 performs various computations by executing programs (codes) stored in the hard disk drive 114. The memory 112, which is typically a volatile storage device such as a dynamic random access memory (DRAM), stores program data read from the hard disk drive 114, as well as data received from the reader/writer 200 and data about a workpiece.

The input interface 118 relays data transferred between the CPU 110 and an input device such as a keyboard 104, a mouse (not shown) 103, and a touch panel (not shown). In other words, the input interface 118 receives operational instructions provided from a user operating the input device.

The display controller 120 is connected to a display 102, which is a typical example of a display device, and presents, for example, the processing results obtained by the CPU 110 to the user by displaying the information.

The communication interface 124 relays data transferred between the CPU 110 and the reader/writer 200 with a local area network (LAN). The data reader/writer 126 relays data transferred between the CPU 110 and a memory card 106, which is a storage medium.

The device 100 may be connected to another output device, such as a printer, as appropriate.

Configuration of Reader/Writer 200 and RF Tag 300

Figure 3:
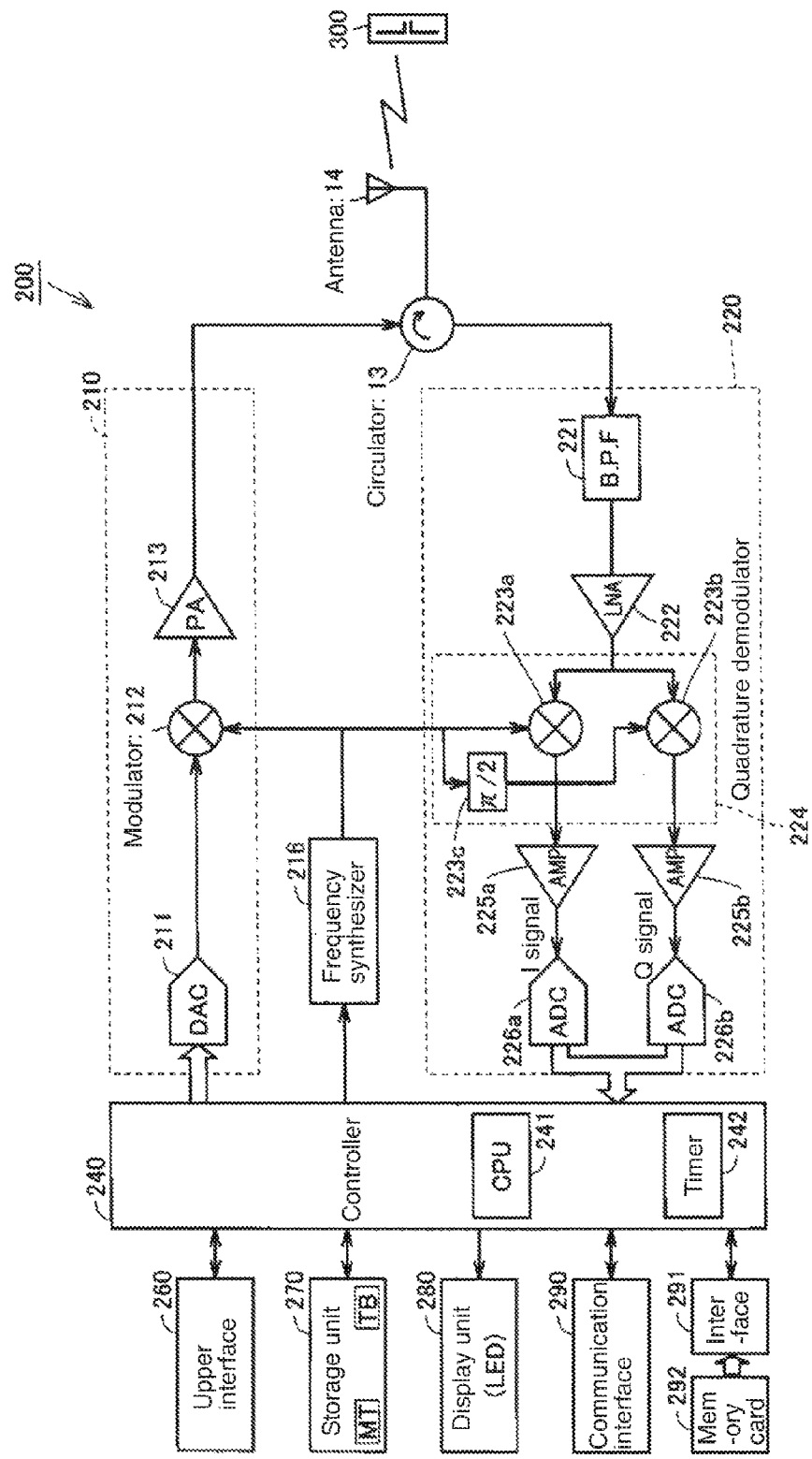
FIG. 3 is a block diagram of a reader/writer 200 according to the embodiment.
Figure 4:
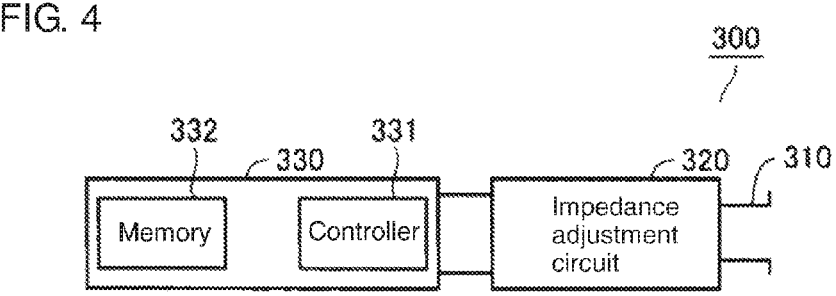
FIG. 4 is a block diagram of an RF tag 300 according to the embodiment.

FIG. 3 is a block diagram of the reader/writer 200 according to the embodiment. FIG. 4 is a block diagram of the RF tag 300 according to the embodiment. In the embodiment, the RF tag 300 in FIG. 4 is a passive tag, which has no internal power source and operates with the electromotive force generated by waves transmitted from the reader/writer 200. The RF tag 300 includes a tag integrated circuit (IC) 330 including a controller 331 and a semiconductor memory 332, and a communication unit. The communication unit includes an antenna 310 and an impedance adjustment circuit 320. In addition to a computer, the controller 331 includes, for example, a modem circuit for modulating or demodulating communication signals transmitted to and received from the reader/writer 200. The RF tag 300 may not be a passive tag, and may be a tag including an internal power source.

Referring to FIG. 3, the reader/writer 200 includes an interrogation unit for interrogating the RF tag 300, an antenna 14 connected to the interrogation unit, a controller 240 including a central processing unit (CPU) 241 and a timer 242, a communication unit for communicating with the device 100, a storage unit 270, which is a volatile or nonvolatile storage medium such as a read-only memory (ROM) and a random-access memory (RAM), a display unit 280 including a numerical display and multiple display lamps (e.g., light emitting diodes, or LEDs), a communication interface 290 for communicating with an external network, and an interface 291. The reader/writer 200 is further connected to a received signal strength indicator (RSSI) detector (not shown) for the antenna 14. The RSSI detector measures the spatial power received by the antenna 14 and outputs the measurement value. The output measurement value indicates a received signal strength indicator (RSSI) in dBm.

The interrogation unit includes a transmission unit 210, a reception unit 220, a frequency synthesizer 216, and a circulator 13. The communication unit includes an upper interface 260, which is a communication module. The controller 240 controls the interrogation unit and the communication unit.

The interface 291 relays data transferred between the CPU 241 and a memory card 292, which is a storage medium. More specifically, the memory card 292 prestoring programs to be executed in the reader/writer 200 is distributed. The interface 291 reads a program from the memory card 292. The interface 291 also writes the processing results associated with the communication with the device 100 or with the RF tag 300 to the memory card 292 in response to an internal command from the CPU 241. The memory card 292 includes a general-purpose semiconductor storage device such as a compact flash (CF) and a secure digital (SD), a magnetic storage medium such as a flexible disk, or an optical storage medium such as a compact disk read-only memory (CD-ROM).

The controller 240 has the functions equivalent to the functions of a computer. More specifically, the CPU 241 performs data processing including a communication process with the device 100 and an interrogation process with the RF tag 300 in accordance with a program stored in the memory such as the storage unit 270. The controller 240 outputs a pulse signal representing a command associated with the interrogation process with the RF tag 300. This output signal is hereafter also referred to as a command.

The storage unit 270 stores programs and data for data processing. The storage unit 270 stores data to be read and/or written by the CPU 241 for performing the interrogation process.

The reception unit 220 that performs single side band (SSB) reception will now be described. Referring to FIG. 3, the reader/writer 200 includes a transmission unit 210, a reception unit 220, the circulator 13, the frequency synthesizer 216, and the controller 240. The circulator 13 forwards a signal transmitted from the transmission unit 210 to the antenna 14, and forwards a signal from the RF tag 300 received at the antenna 14 to the reception unit 220. The frequency synthesizer 216 provides carrier waves to the transmission unit 210 and the reception unit 220. The controller 240 controls the transmission unit 210 and the reception unit 220. The reader/writer 200 transmits and receives signals to and from the RF tag 300 via the antenna 14.

The transmission unit 210 includes a digital-to-analog (DA) converter 211, which converts a digital signal (including a command signal) from the controller 240 into an analog signal, a modulator 212, which is connected to the DA converter 211 and modulates a carrier wave from the frequency synthesizer 216 in response to a transmission base band signal, and a power amplifier 213. The output of the power amplifier 213 is input into the circulator 13.

The reception unit 220 includes a band pass filter (BPF) 221, which limits the band of a reception signal received from the circulator 13, a low-noise amplifier 222, which is connected to the band pass filter 221, and a quadrature demodulator 224, which receives an output signal from the low-noise amplifier 222 and a carrier wave from the frequency synthesizer 216 and outputs signals with phases shifted relative to each other by 90 degrees. The quadrature demodulator 224 includes multipliers 223*a* and 223*b*, and a π/2 phase shifter 223*c*, which shifts the phases of signals to demodulate the signals having phases orthogonal to each other. The signals I and Q, which are demodulated by the quadrature demodulator 224, are transmitted to the corresponding amplifiers 225*a* and 225*b* for amplifying these signals, and analog-to-digital (AD) converters 226*a* and 226*b* for converting these signals to digital signals. The signals I and Q are then combined and input into the controller 240. The quadrature demodulator 224, the amplifiers 225*a* and 225*b*, the AD converters 226*a* and 226*b*, and a demodulated signal processing unit (not shown) included in the controller 240 enable the demodulation function.

Interrogation Operation

An interrogation operation performed between the reader/writer 200 shown in FIG. 3 and the RF tag shown in FIG. 4 will now be described. The interrogation operation is performed when the reader/writer is in the working mode and in the test mode.

More specifically, to write or read data to or from the RF tag 300, the reader/writer 200 transmits a command received from the device 100 to the RF tag 300, and receives a response to the command from the RF tag 300. The reader/writer 200 then transmits the received response to the device 100. The RF tag 300, which has no internal power source, receives waves transmitted from the antenna 14 and creates the electromotive force at the antenna 310 to drive the control circuit included in the RF tag 300 during the interrogation operation.

During the interrogation, the controller 240 in the reader/writer 200 outputs a command having a predetermined bit count as appropriate. The transmission unit 210 modulates a carrier wave using the command signal to superimpose the command signal onto the carrier wave.

A carrier wave transmitted from the antenna 14 through the above operation generates the electromotive force in the RF tag 300 that is within an interrogation zone. This activates the controller 331 in the RF tag 300. When a carrier wave having a command superimposed on the wave is transmitted from the antenna 14 in this state, the controller 331 in the RF tag 300 interprets the command and performs the designated processing, and then generates a response (response signal) including response data and returns the response to the reader/writer 200.

The reception unit 220 included in the reader/writer 200 receives the response signal from the RF tag 300. The reception unit 220 removes noise from the reception signal and demodulates the signal, and then converts the signal into digital data, which is output to the controller 240. The controller 240 includes a power filter (program module), which removes data with power less than a threshold (in dBm) from the received data. The controller 240 thus receives data with power exceeding the threshold. The power filter may not be a program module. The reception unit 220 may include a power filter circuit, which replaces the program module.

The CPU 241 interprets the response from the RF tag 300 based on the demodulated digital data, and outputs the interrogation result data, including the interpreted data. For example, the CPU 241 transmits the result data to the device 100, stores the data into the storage unit 270, and displays the data on the display unit 280 or turns on the LEDs.

In the present embodiment, the RF tag 300 is a passive tag having no internal power source. The reader/writer 200 thus communicates with the RF tag 300 with a half-duplex scheme, under which the reader/writer 200 uses the antenna 14 commonly for both transmission and reception, but separates transmission signals and reception signals.

Test Mode

The test mode according to the embodiment will now be described. In response to an operation of a selector switch (not shown), the reader/writer 200 switches from the working mode to the test mode. In the test mode, the conveyor C at the production line is stopped, and the reader/writer 200 interrogates a target RF tag 300 (refer to the hatched portion in FIG. 1) that is stationary at a predetermined position on the conveyor C. The target RF tag 300 is located at a distance that allows the reader/writer 200 to normally integrate the RF tag. The data (values) determined in the test mode is stored into the storage unit 270, and is set in the components in the working mode.

In the test mode, the CPU 241 in the reader/writer 200 determines whether the interrogation with the target RF tag 300 has failed. For example, the CPU 241 detects either data integrity (with no data error) or data disintegrity (with a data error) from data resulting from analogue to digital conversion of a response signal, which is received in response to a command transmitted to the target RF tag 300, using the value of an error-detecting code called cyclic redundancy check (CRC) included in the data. The CPU 241 determines that the interrogation has been successful when detecting the data integrity, and determines that the interrogation has failed when detecting the data disintegrity.

The CPU 241 may determine a failed interrogation when receiving no response signal within a predetermined time after transmitting the command, and may determine a successful interrogation when receiving a response signal within the predetermined time.

Other criteria for determining either a failed or successful interrogation will now be described. In some embodiments, the CPU 241 determines a failed interrogation when the reader/writer 200 transmits a read command and receives a response signal including a code indicating a reading failure from the RF tag 300. The CPU 241 determines a successful interrogation when the reader/writer 200 receives a response signal including a code indicating a reading success from the RF tag 300.

In other embodiments, the CPU 241 determines a failed interrogation when the reader/writer 200 transmits a write command and receives a response signal including a code indicating a writing failure from the RF tag 300. The CPU 241 determines a successful interrogation when the reader/writer 200 receives a response signal including a code indicating a writing success from the RF tag 300.

The CPU 241 may further determine either a successful or failed interrogation based on a combination of the integrity of data and the reception status of a response within a predetermined time. Other criteria may be used to determine either a successful or failed interrogation.

In the embodiment, the CPU 241 calculates an interrogation success rate (in %) in the test mode based on, for example, the number of successful interrogations within a predetermined time for which the CPU 241 repeatedly transmits the same command N times, or the number of consecutive successful interrogations or the number of failed interrogations within the predetermined time.

Figure 5:
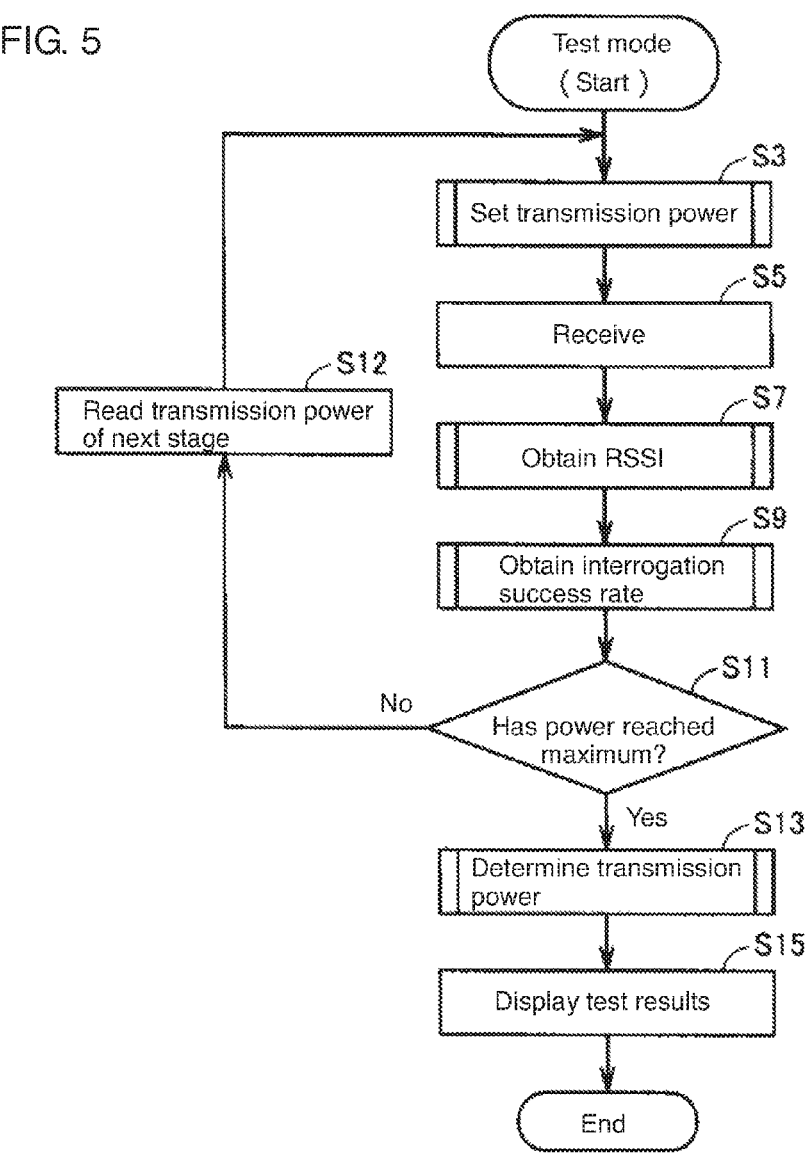
FIG. 5 is a flowchart showing the processing performed in a test mode according to the embodiment.
Figure 6:
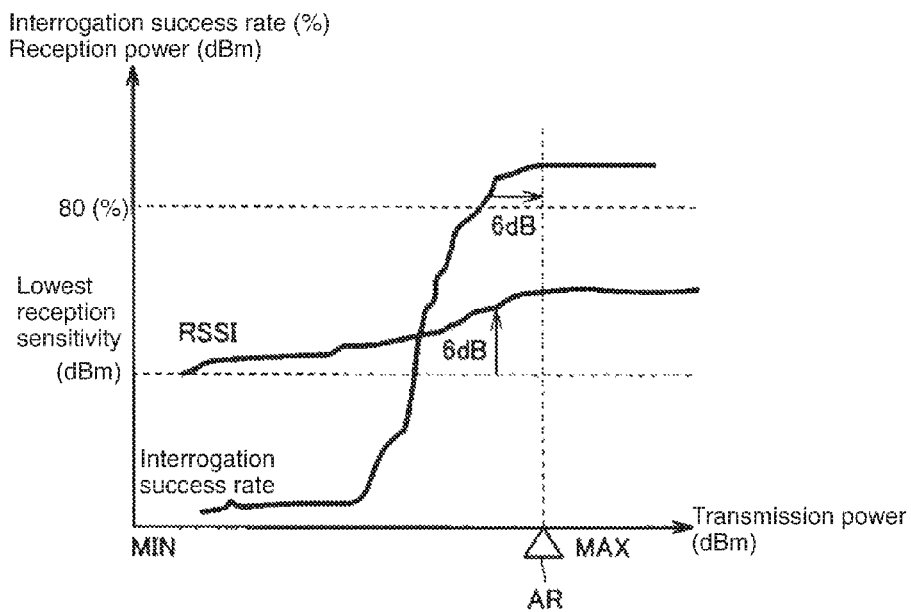
FIG. 6 is a diagram showing an example display screen on which an output is displayed in the test mode according to the embodiment.

FIG. 5 is a flowchart showing the processing performed in the test mode according to the embodiment. The storage unit 270 in the reader/writer 200 prestores a program for implementing the processing. When switched to the test mode, the CPU 241 reads the program from the storage unit 270 and executes the program. FIG. 6 is a diagram showing an example display screen on which an output is displayed in the test mode according to the embodiment. FIG. 6 shows the results of simulation performed by the inventors using the reader/writer 200 in the test mode.

Referring to FIG. 5, when the processing starts, the CPU 241 sets the transmission power in several stages from the minimum power to the maximum power by adjusting the supply voltage. The CPU 241 changes the transmission power in these stages. The minimum to maximum power, which is represented by characteristic values unique to the reader/writer 200, ranges, for example, from very weak transmission power to the maximum transmission power, which enables stable interrogation. In this embodiment, the transmission power is set in 1 to M stages. The storage unit 270 prestores a table TB including transmission power values in M stages from the minimum (1) to the maximum (M).

First, the CPU 241 searches the table TB and changes the transmission power to the minimum (1), and starts oscillation of a carrier signal using the frequency synthesizer 216 (step S3) to interrogate the target RF tag 300.

When the reader/writer 200 receives a response from the target RF tag 300, the CPU 241 obtains an RSSI, which is a measurement value provided from the RSSI detector (step S7). The CPU 241 also calculates (obtains) an interrogation success rate (step S9). The CPU 241 stores the obtained RSSI and the interrogation success rate in a manner associated with the transmission power value obtained in step S3 into an area MT in the storage unit 270.

The CPU 241 determines whether the transmission power has reached the maximum (M) stage (step S11). When determining that the transmission power has not reached the maximum (M) stage (No in step S11), the CPU 241 reads the value of the transmission power of the next stage from the table TB (step S12). The CPU 241 then starts, using the frequency synthesizer 216, oscillation of a carrier signal based on the changed transmission power read after searching the table TB (step S3) to interrogate the target RF tag 300. Based on a signal from the target RF 300, the CPU 241 obtains the RSSI and the interrogation success rate described above for the changed transmission power (steps S5 to S9). The changed power transmission value, the obtained RSSI, and the obtained interrogation success rate are stored into the area MT in a manner associated with one another.

The transmission power is increased in stages as described above, and the RSSI and the interrogation success rate are obtained for every increase in the transmission power. This operation is repeated until the transmission power reaches the maximum (M) stage (Yes in step S11). The CPU 241 then determines the transmission power to be set in the reader/writer 200 in the working mode (step S13).

In the determination performed in step S13, the CPU 241 analyzes time-series data including the transmission power, the RSSI, and the interrogation success rate associated with one another, which is stored in the area MT. Based on the analysis results, the CPU 241 reads, from the area MT, the transmission power associated with a sufficiently high interrogation success rate with the target RF tag 300 and a sufficiently high RSSI. This determines the transmission power value that allows the interrogation success rate with the target RF tag 300 and the RSSI to be sufficiently high. The determined transmission power value is stored into the storage unit 270 as the transmission power in the working mode.

The CPU 241 also creates two-dimensional graph data using the time-series data stored in the area MT, and outputs display data in accordance with the graph data to the display unit 280. The display data activates the display unit 280 to display, for example, the graph showing the test results in FIG. 8 on a screen (step S15). The processing in the test mode ends.

The transmission power is increased or decreased between the minimum power and the maximum power. The transmission power may not be changed in stages as described above, and may be changed discretely (e.g., increased in units of 3 dBm) or may be changed using binary search (e.g., a middle value ((max+min)/2) is set initially, and the measurement using the middle value of the lower half is repeated when the criterion is satisfied).

Determination of Transmission Power

A method for determining the transmission power according to the embodiment will now be described with reference to FIG. 6. In the embodiment, the CPU 241 determines the transmission power to change from the transmission power that yields an interrogation success rate of at least 80% (threshold) to the transmission power having a first margin, or from the transmission power that yields the RSSI indicating the lowest reception sensitivity (threshold) unique to the reader/writer 200 to the transmission power having a second margin. The lowest reception sensitivity is a minimum reception power value that enables interrogation of the reader/writer 200. The above threshold of 80% is an example and is non-limiting.

Although the first margin and the second margin are both set at 6 dBm in FIG. 6, the margins may be set at any values or may be variable.

Determination of Transmission Power for Each Channel

The reader/writer 200 has a plurality of channels to be used. In the test mode according to the embodiment, the reader/writer 200 performs the processing described with reference to FIG. 5 for each channel, and outputs the graph shown in FIG. 6 for each channel. The transmission power used in the working mode can be determined separately for each channel.

A representative value from the transmission power values determined for these channels may be determined as a common transmission power value for all the channels. The representative value may be an average, a mode, or a median of the transmission power determined for each channel.

Determination of Transmission Power Based on Distance to RF Tag 300

In the test mode according to the embodiment, the reader/writer 200 is installed at different distances from the RF tag 300, and performs the processing described with reference to FIG. 5 for each distance. The reader/writer 200 then outputs the graph shown in FIG. 6 for each distance, and determines the transmission power for each distance.

Warning Output

In the test mode, the CPU 241 may display a warning on, for example, the display unit 280 when the CPU 241 cannot determine an optimum transmission power value. The warning may be output as a sound, instead of being displayed.

Figure 7:
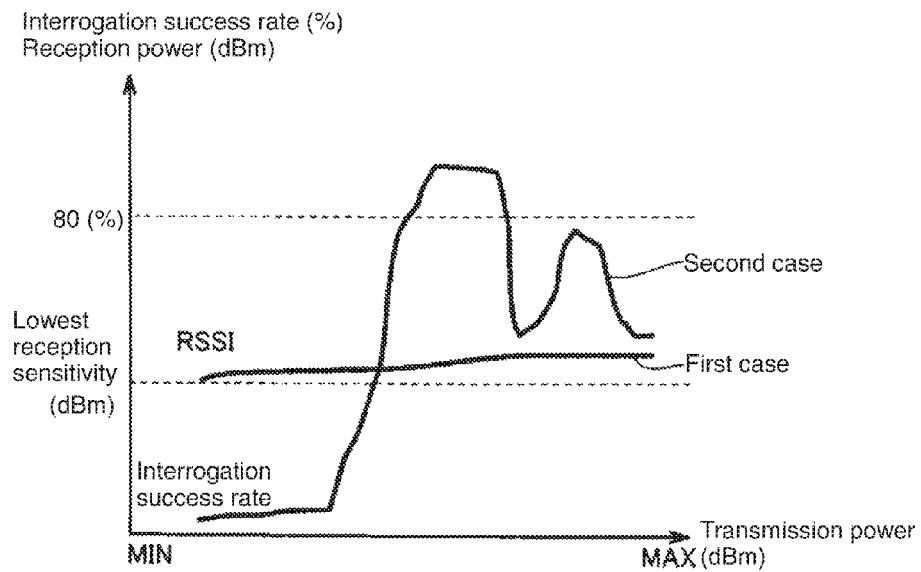
FIG. 7 is a diagram showing another example display screen on which an output is displayed in the test mode according to the embodiment.

FIG. 7 is a diagram showing another example display screen on which an output is displayed in the test mode according to the embodiment. Although the transmission power is determined in the same manner as in FIG. 5, the obtained transmission power can be unsuitable depending on the test environment.

For example, when the CPU 241 performs the processing in FIG. 5 and detects changes in the interrogation success rate and the RSSI as shown in FIG. 7, the CPU 241 successfully determines the transmission power but outputs a warning. For example, when the RSSI remains low after the transmission power is changed to the maximum (M) as in the first case in the test mode in FIG. 7, the reception power is insufficient with respect to the transmission power. The CPU 241 compares a pattern of the changes in the RSSI with a predetermined pattern, and determines that this pattern corresponds to the first case based on the result of the comparison. In this case, the CPU 241 outputs a signal indicating a successful determination of the transmission power and also outputs a warning (e.g., a message indicating that the distance from the RF tag is too large).

The CPU 241 can thus output a message prompting the user to retry the test mode (to redetermine the transmission power) while eliminating any factors that may destabilize the operation in the working mode, although the transmission power is successfully determined.

The relationship between the transmission power Tx and the reception power Rx can be theoretically expressed by a function of distance d as follows:

$$Rx = Tx - 20\log(\lambda/(4\pi d))$$

When the transmission power is changed to the maximum (M) in the test mode, the RSSI typically converges to about 80% and thus the transmission power can be determined. In contrast, as in the second case shown in FIG. 7, the RSSI may not converge to 80% after the transmission power is changed to the maximum (M) but may fluctuate below 80% within a predetermined range. In this case, the transmission power is not determined successfully. Such fluctuations of the RSSI may be caused by a reception signal that is attenuated by the surrounding strong reflection elements.

The CPU 241 compares a pattern of the changes in the RSSI with a predetermined pattern, and determines that this pattern corresponds to the second case. In this case, the CPU 241 outputs a signal indicating a failed determination of the transmission power and also outputs a warning (e.g., a prompt message indicating to remove any nearby radio wave reflector).

When failing to determine the transmission power, the CPU 241 outputs a message indicating a possible cause for the failure to prompt the user to retry the test mode (to redetermine the transmission power) eliminating the cause.

Determination of Other Parameters

The test mode according to the embodiment may be used to determine parameters other than the transmission power described above.

Reception Power Threshold

In the embodiment, a threshold for the reception power received by the reader/writer 200 in the working mode is changed in accordance with the transmission power determined in the test mode.

Figure 8:
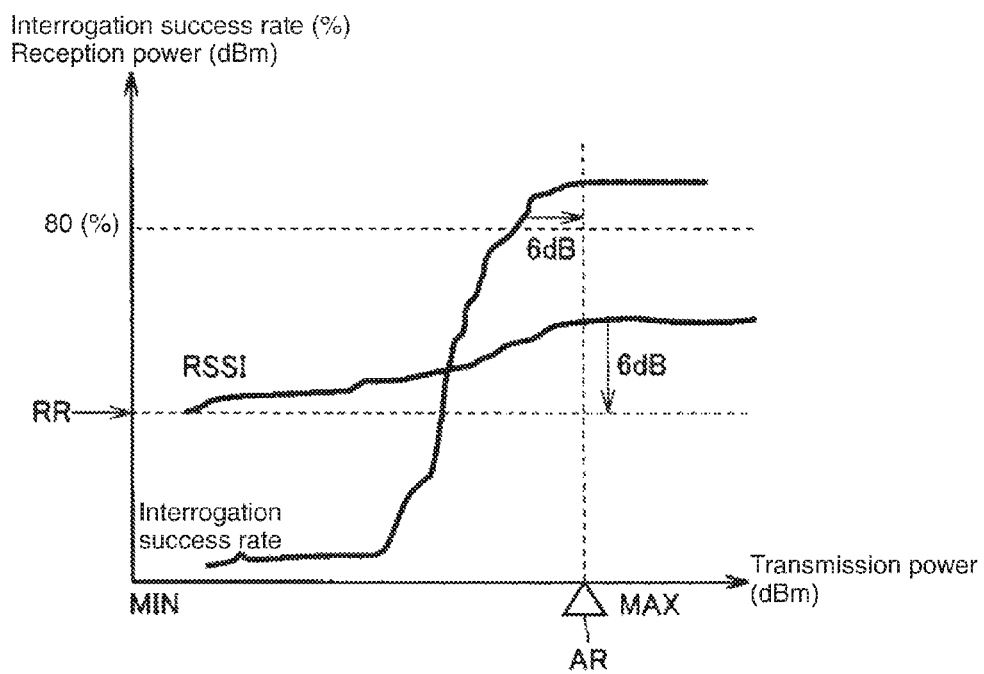
FIG. 8 is a diagram describing a method for determining a threshold for a reception power filter according to the embodiment.

FIG. 8 is a diagram describing a method for determining a threshold for a reception power filter according to the embodiment. FIG. 8 is a graph showing the results obtained in the test mode shown in FIG. 6, as well as a threshold RR for the reception power filter. The CPU 241 determines the threshold for the reception power filter in accordance with the transmission power determined in the test mode.

In the working mode, the CPU 241 changes (switches) the threshold for the power filter to the determined threshold. In the embodiment, the threshold is calculated based on, for example, the RSSI value (in dBm) corresponding to the determined transmission power and a predetermined margin (e.g., −6 dBm). For example, the CPU 241 calculates the threshold as the threshold RR=RSSI−6 dBm based on the RSSI value corresponding to the determined transmission power AR and the margin as shown in FIG. 8.

In the working mode, the power filter can be set to cut reception signals with power less than the filter threshold selectively from the reception signals output from the antenna unit. In the working mode, the power filter is used to exclude, from an interrogation target, an RF tag 300 that transmits a response signal corresponding to reception power less than the threshold RR, which is determined to be an unintended RF tag.

In the test mode, the power filter has the filter threshold that is set sufficiently high.

Determination of Channel to be Used

In the test mode in the embodiment, the processing described above is performed for each channel (carrier frequency) that can be used for interrogation while switching between the channels. The CPU 241 controls the frequency synthesizer 216 to output a carrier waves with a different frequency (channel).

Of the channels for which the transmission power has been determined successfully, the CPU 241 determines a channel having the highest interrogation success rate as a channel to be used for interrogation in the working mode.

Determination of Interrogation Mode

In the embodiment, the bit rate (bit/sec), or the communication rate, is determined in the test mode. More specifically, the CPU 241 controls the modulator 212 to modulate the amplitude of a carrier wave at a different bit rate in the test mode in accordance with a command with a predetermined length. The processing in the test mode is performed for each bit rate (bit/sec).

Of the communication rates for which the transmission power has been determined successfully, the CPU 241 determines a communication rate having the highest interrogation success rate as a communication rate to be used for interrogation in the working mode.

Determination of Transmission Power for Each RF Tag

Figure 9:
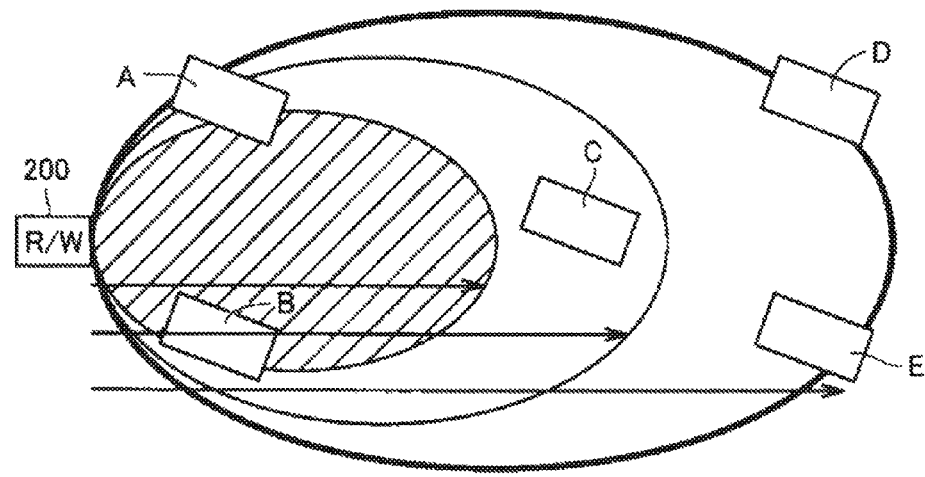
FIG. 9 is a diagram showing another arrangement of RF tags in the test mode according to the embodiment.

In the embodiment, the transmission power that enables successful interrogation is determined for all the RF tags 300 arranged in a zone where the user uses the reader/writer 200. FIG. 9 is a diagram showing another arrangement of RF tags in the test mode according to the embodiment. In FIG. 9, the RF tags 300, or RF tags (A) to (E), are fixed at different positions in a zone defined to contain radio waves radially emitted from the reader/writer 200.

The RF tags (A) to (E) each have an identification (ID) that is stored in the semiconductor memory 332 with a user operation performed in the test mode. The reader/writer 200 sets the ID of a target RF tag 300 in a transmission command in the test mode. This allows the reader/writer 200 to individually designate the RF tags (A) to (E) and perform the test mode for each designated target RF tag 300.

Based on the results of the test mode for the RF tags (A) to (E), the CPU 241 selects an RF tag for which the transmission power has been determined successfully. The CPU 241 may then determine a representative value (an average, a mode, or a median) of the transmission power for the selected RF tag 300 as a common transmission power value for all the RF tags (A) to (E).

Although the information including the test mode results is displayed on the display unit 280 in the above embodiment, the information may not be displayed on the display unit 280. For example, the reader/writer 200 may transmit the information to the device 100 to display the information on the display 102 connected to the device 100.

Other Embodiments

Modifications of the above embodiment will now be described. In one other embodiment, measurement processes for measuring the reading success rate and the writing success rate and adjustment processes for adjusting the transmission power based on the results from the measurement processes, both performed in the test mode, will be described. The reading success rate and the writing success rate in this embodiment each correspond to the interrogation success rate.

Figure 10:
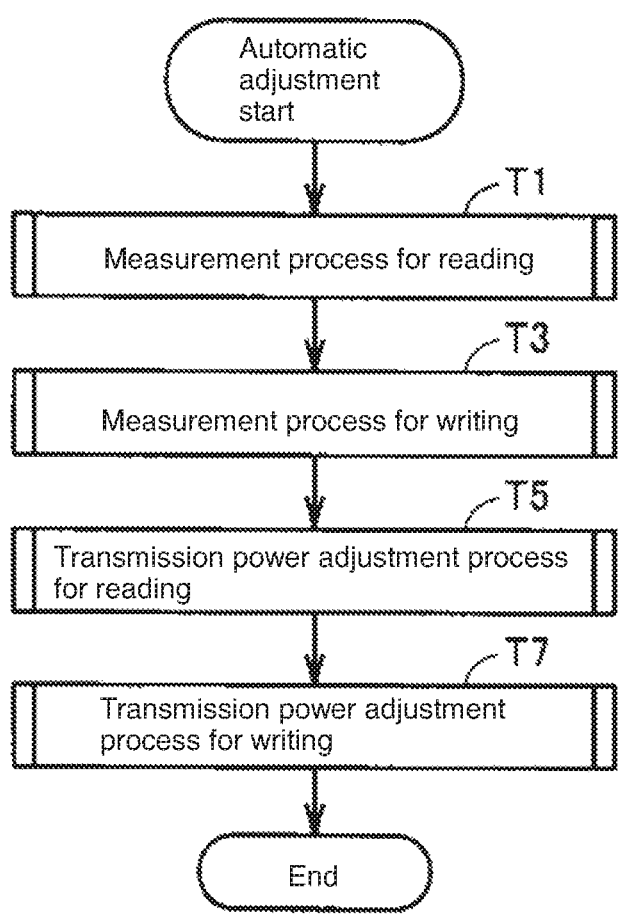
FIG. 10 is a flowchart schematically describing the processing according to another embodiment.
Figure 11:
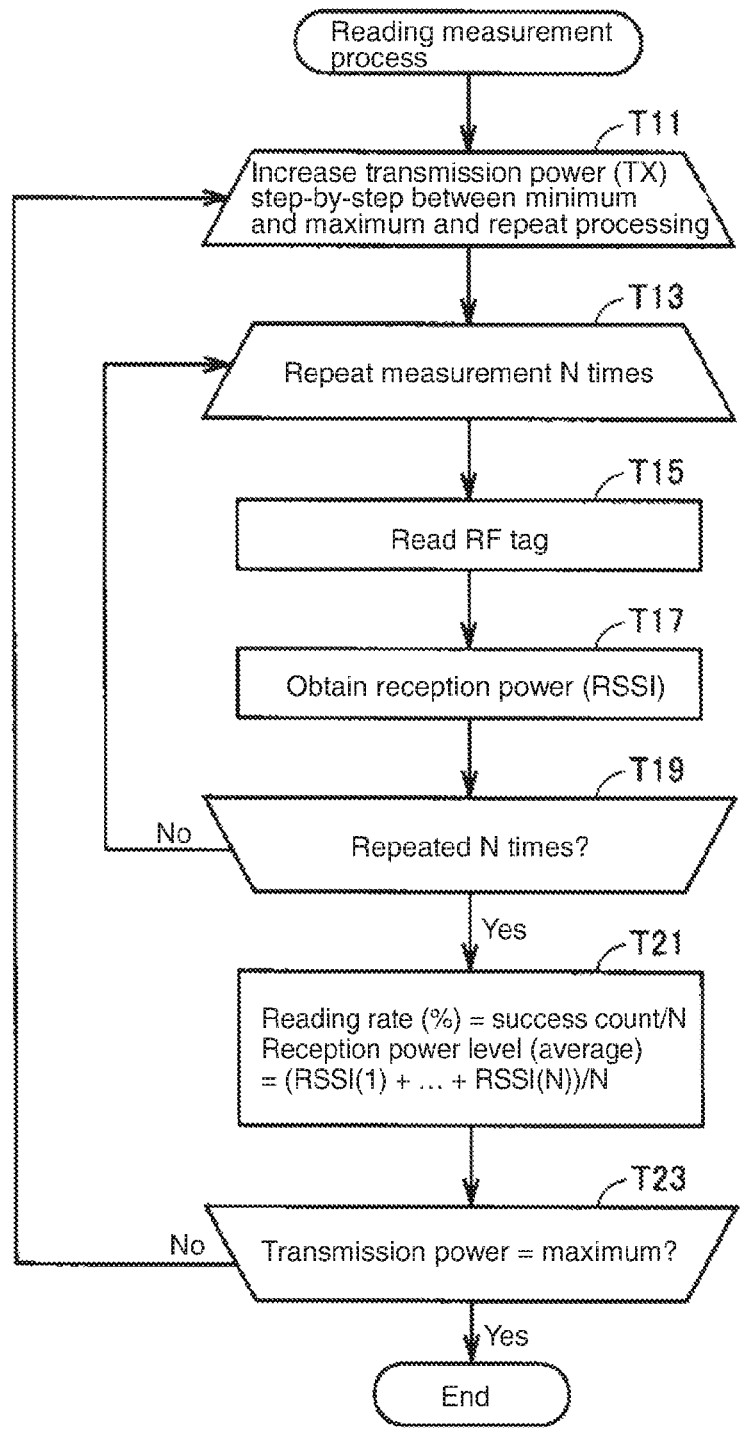
FIG. 11 is a flowchart showing a measurement process for reading in FIG. 10.
Figure 12:
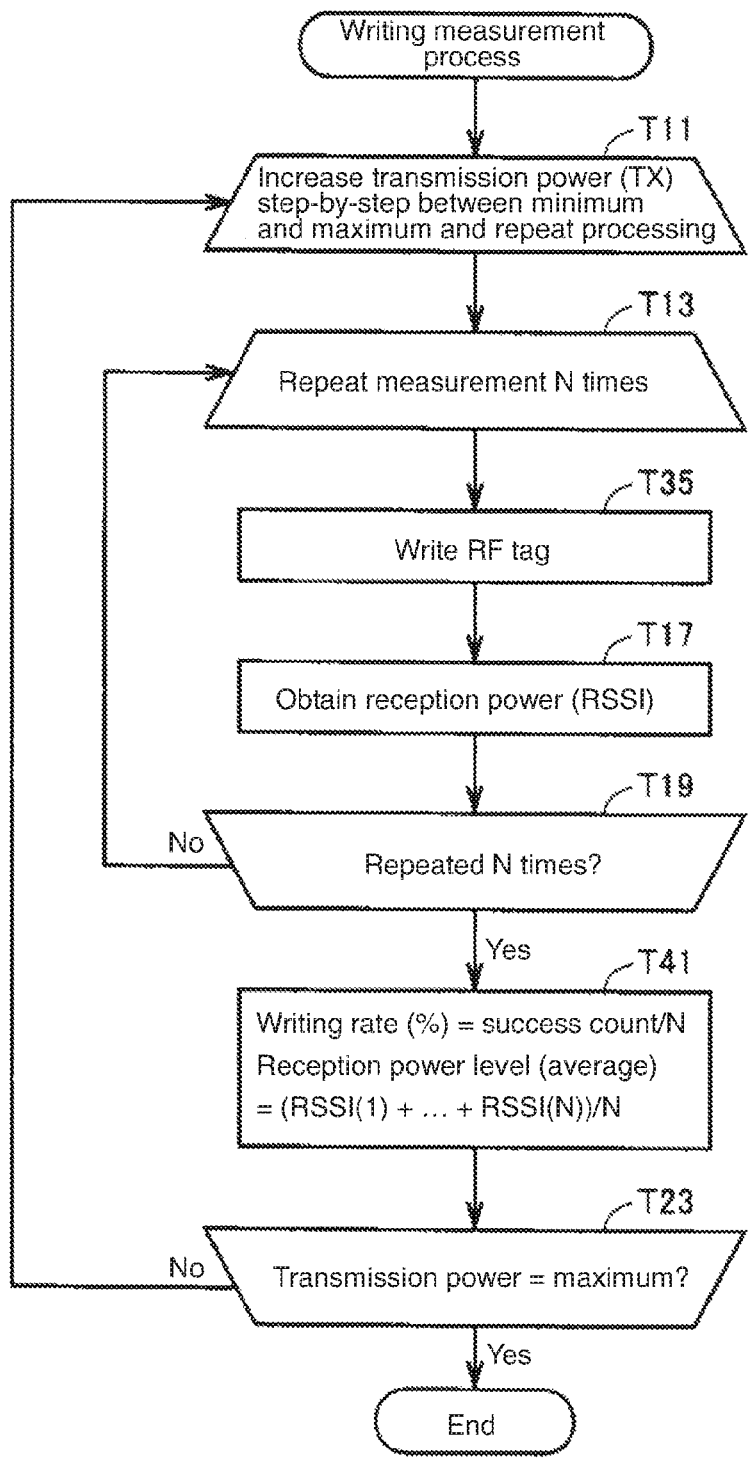
FIG. 12 is a flowchart showing a measurement process for writing in FIG. 10.

FIG. 10 is a flowchart showing the processing according to the other embodiment. The storage unit 270 prestores a program for implementing the processing in the flowchart of FIG. 10. When the reader/writer 200 switches to the test mode, the CPU 241 reads this program from the storage unit 270 and executes the read program. FIG. 11 is a flowchart showing a measurement process for reading in FIG. 10. FIG. 12 is a flowchart showing a measurement process for writing in FIG. 10.

Figure 13:
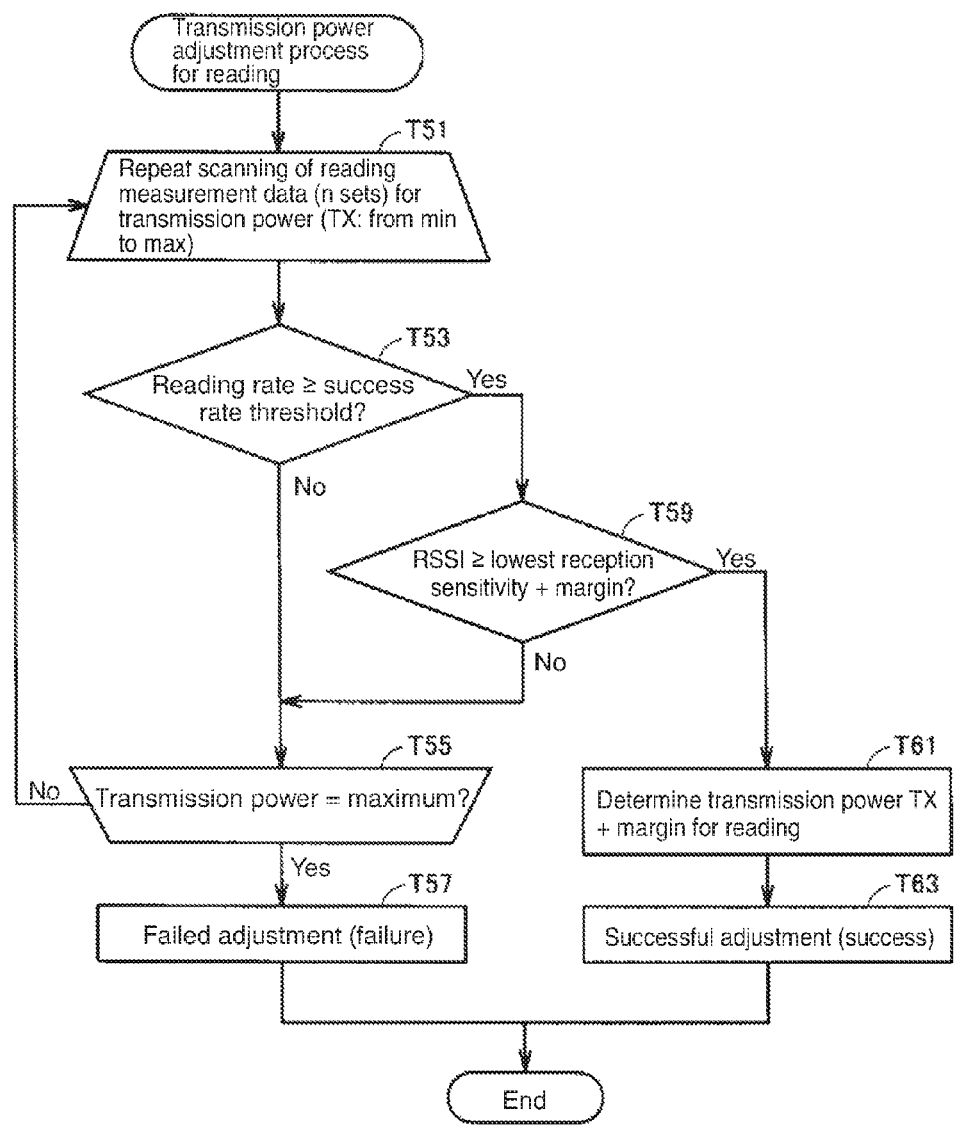
FIG. 13 is a flowchart showing a transmission power adjustment process for reading in FIG. 10.
Figure 14:
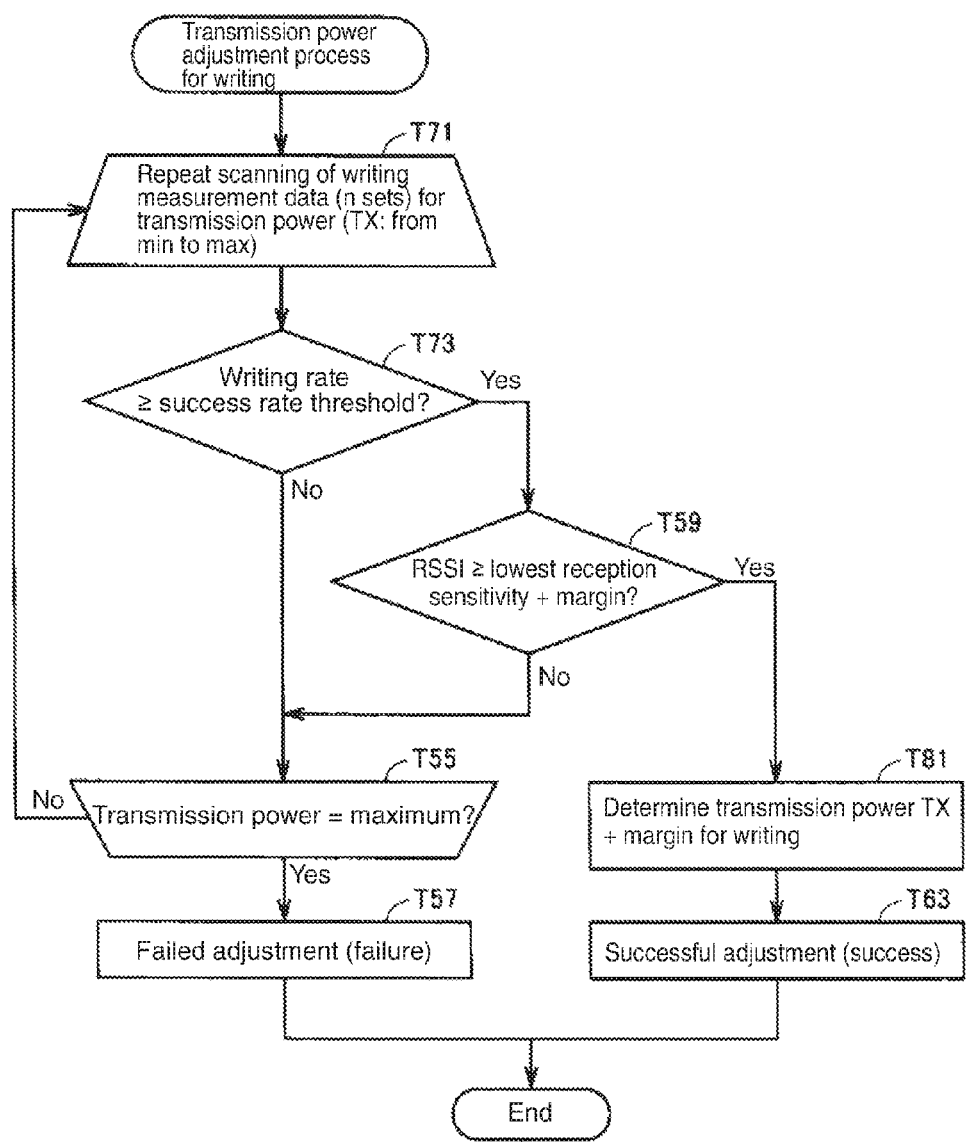
FIG. 14 is a flowchart showing a transmission power adjustment process for writing in FIG. 10.
Figure 16:
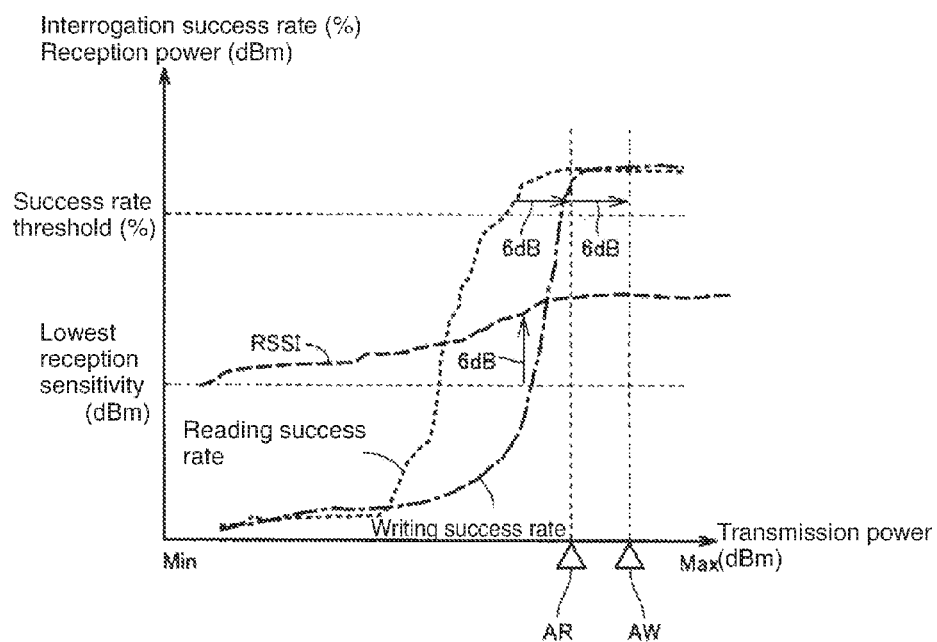
FIG. 16 is a diagram showing an example display screen in the test mode according to another embodiment.

FIG. 13 is a flowchart showing a transmission power adjustment process for reading in FIG. 10. FIG. 14 is a flowchart showing a transmission power adjustment process for writing in FIG. 10. FIG. 15 is a schematic diagram showing measurement data according to another embodiment. FIG. 16 is a diagram showing an example display screen in the test mode according to another embodiment. FIG. 16 shows the results of simulation performed by the inventors using the reader/writer 200 in the test mode and executing the program for implementing the processing in the flowcharts of FIGS. 10 to 14.

Referring now to FIG. 10, the processing starts in the test mode, and then the CPU 241 performs the reading measurement process (step T1), and stores the result into the storage unit 270. The CPU 241 also performs the writing measurement process (step T3), and stores the processing result into the storage unit 270.

The CPU 241 performs the transmission power adjustment process for reading based on the result of the reading measurement process stored in the storage unit 270 (step T5). The processing result is then stored into a table TBR (refer to FIG. 15) in the storage unit 270. The CPU 241 also performs the transmission power adjustment process for writing based on the result of the writing measurement process stored in the storage unit 270 (step T7). The processing result is then stored into a table TBW (refer to FIG. 15) in the storage unit 270.

The reading measurement process and the writing measurement process may not be performed in the order shown in FIG. 10, and may be performed in a different order. The transmission power adjustment process for reading and the transmission power adjustment process for writing also may not be performed in the order shown in FIG. 10, and may be performed in a different order.

Referring to FIG. 15, the table TBR, which has the same structure as the table TBW, will now be described as a typical example. The table TBR stores transmission power values, or transmission power TX(i) (i=1, 2, ... n), obtained in the reading measurement process, and data D(j) (j=1, 2, ... N) measured using the transmission power TX(i) in a manner associated with each other. In the same manner, the table TBW stores transmission power values, or transmission power TX(i) (i=1, 2, ... n), obtained in the writing measurement process, and data D(j) (j=1, 2, ... N) measured using the transmission power TX(i) in a manner associated with each other. The measurement data D(j) in the tables TBR and TBW includes RSSIs as described later.

Referring to FIG. 11, the reading measurement process (step T1) will now be described. The CPU 241 sets the transmission power in several stages ranging from the minimum power Min to the maximum power Max by adjusting the supply voltage in the same manner as in the embodiment described above, and increases the transmission power step-by-step in stages. The CPU 241 repeats the processing performed in steps T13 to T23. The number of stages is n (n>1). The CPU 241 thus changes the transmission power TX(i) (i=1, 2, ... n) in these stages by adjusting the supply voltage.

In each process repeated n times, the measurement is repeated N times (steps T13 to T19). In each measurement process, the CPU 241 transmits a reading command from the interrogation unit using the transmission power TX(i). The CPU 241 receives a response to the command from the RF tag 300, and determines whether the interrogation has been successful (or failed) based on the response (step T15). The CPU 241 also obtains an RSSI from the RSSI detector (step T17). Sets of measurement data D(j) (where j=1, 2, ... N) each including the obtained information indicating a successful interrogation (or a failed interrogation) and the RSSI are stored into the table TBR in a manner each associated with the corresponding transmission power TX(i).

The CPU 241 determines whether the measurement has been repeated N times (step T19). When the CPU 241 determines that the measurement has not been repeated N times (No in step T19), the CPU 241 returns to the processing in step T13, and repeats the subsequent processing in the same manner as described above.

When the CPU 241 determines that the measurement has been repeated N times (Yes in step T19), the CPU 241 calculates the reading rate (in %) and the reception power level (average reception power level) based on the measurement data D(j), which is stored in the table TBR in a manner associated with the corresponding transmission power TX(i) (step T21). More specifically, the calculation is performed using the following formulas. The formulas are examples and are non-limiting.

Reading rate $R(i)$=successful interrogation count/$N$ (%)

Average reception power level $P(i)$=(RSSI(1)+ ... +RSSI($N$))/$N$

The CPU 241 stores, in a manner associated with the transmission power TX(i), the reading rate R(i) and the average reception power level P(i) calculated in the manner described above into a predetermined area of the storage unit 270.

The CPU 241 then determines whether the transmission power TX(i) has reached the maximum power Max (step T23). When the CPU 241 determines that the transmission power TX(i) is less than the maximum power Max (No in step T23), the CPU 241 returns to the processing in step T11, changes the transmission power to the transmission power TX(i+1) of the next stage, and repeats the processing in the step T13 and subsequent steps in the same manner as described above. When the CPU 241 determines that the transmission power TX(i) has reached the maximum power Max (Yes in step T23), the measurement processing ends.

The table TBR stores sets of measurement data D(1) to D(N) in a manner associated with the corresponding transmission power TX(i). The storage unit 270 stores the reading rate R(i) and the average reception power level P(i) calculated for each value of the transmission power TX(i) in the predetermined area.

The writing measurement process will now be described with reference to FIG. 12. The process shown in FIG. 12 is similar to the process shown in FIG. 11, and will be described focusing on the differences. In the writing measurement process, the reader/writer 200 writes data to the semiconductor memory 332 in the RF tag (step T35), and the storage unit 270 stores, in a manner associated with the transmission power TX(i), the writing rate W(i) and the average reception power level P(i) calculated using the formulas described below into a predetermined area (step T41).

Writing rate $W(i)$=successful interrogation count/$N$(in %)

Average reception power level $P(i)$=(RSSI(1)+ ... +RSSI($N$))/$N$

The other processing in FIG. 12 (steps T11, T13, T17, T19, and T23) is substantially the same as the processing described with reference to FIG. 11, and will not be described redundantly.

Through the process shown in FIG. 12, the table WBR stores sets of measurement data D(1) to D(N) each including information about a successful interrogation (or a failed interrogation) and the RSSI in a manner each associated with the corresponding transmission power TX(i). The storage unit 270 stores the writing rate W(i) and the average reception power level P(i) calculated for the corresponding transmission power TX(i) in the predetermined area.

The transmission power adjustment process for reading will now be described with reference to FIG. 13. The CPU 241 determines the transmission power used for the reading process in the working mode based on the reading rate R(i) and the average reception power level P(i), which are associated with the corresponding transmission power TX(i) stored in the storage unit 270 through the reading measurement process described with reference to FIG. 11.

More specifically, the CPU 241 reads the reading rate R(i) and the average reception power level P(i) associated with the transmission power TX(i) from the storage unit 270 (step T51). The CPU 241 then determines whether the condition written as the reading rate R(i)≥the success rate threshold is satisfied for the read reading rate R(i) (step T53). When determining that the condition is not satisfied (No in step T53), the CPU 241 advances to the processing in step T55.

When determining that the condition is satisfied (Yes in step T53), the CPU 241 determines, for the average reception power level P(i) described above, whether the condition written as P(i)≥lowest reception sensitivity+margin is satisfied (step T59).

When determining that the condition is not satisfied (No in step T59), the CPU 241 advances to the processing in step T55. When determining that the condition is satisfied, the CPU 241 advances to the processing in step T61.

In step T61, the CPU 241 determines, based on the latest transmission power TX(i) read in step T51, the transmission power TX(i) plus the margin as the transmission power used for the reading process in the working mode (step T61), and stores the determined transmission power into the storage unit 270. The CPU 241 outputs information indicating a successful adjustment (success) (step T63).

In step T55, the CPU 241 determines whether the latest read transmission power TX(i) indicates the maximum power Max (step T55). When determining that the transmission power TX(i) indicates the maximum power Max (Yes in step T55), the CPU 241 outputs information indicating a failed adjustment (failure), or indicating that the CPU 241 has failed to determine the transmission power for the reading process in the working mode (step T57).

When determining that the transmission power TX(i) does not indicate the maximum power Max (No in step T55), the CPU 241 returns to the processing in step T51. Based on the reading rate R(i+1) and the average reception power level P(i+1), which are associated with the transmission power TX(i+1) of the next stage, the CPU 241 performs the processing for determining the transmission power for the reading process in the working mode (steps T53 to T63) in the same manner as described above.

In the process shown in FIG. 13, the CPU 241 determines, based on the reading rate R(i) and the average reception power level P(i), which are associated with the corresponding transmission power TX(i) through the measurement process described with reference to FIG. 11, the transmission power TX(i) satisfying the condition written as the reading rate R(i)≥the success rate threshold, and the condition written as the average reception power level P(i)≥the lowest reception sensitivity+margin, as the transmission power used for the reading process in the working mode.

The success rate threshold, and the lowest reception sensitivity plus the margin are both variable values, which can be obtained preliminary through, for example, experiments.

The transmission power adjustment process for writing will now be described with reference to FIG. 14. The process shown in FIG. 14 is similar to the process shown in FIG. 13, and will be described focusing on the differences. In the transmission power adjustment process for writing, the reader/writer 200 determines the transmission power used for the writing process in the working mode based on the writing rate W(i) and the average reception power level P(i) associated with the corresponding transmission power TX(i) stored in the storage unit 270 (steps T71, T73, T59, and T81). The other processing (steps T55, T57, and T63) is the same as the processing described with reference to FIG. 13, and will not be described redundantly.

In the process shown in FIG. 14, the CPU 241 determines, based on the writing rate W(i) and the average reception power level P(i), which are associated with the corresponding transmission power TX(i) through the measurement process described with reference to FIG. 12, the transmission power TX(i) satisfying the condition written as the writing rate W(i)≥the success rate threshold and the condition written as the average reception power level P(i)≥the lowest reception sensitivity+margin, as the transmission power used for the writing process in the working mode.

In the process shown in FIG. 14, the success rate threshold, and the lowest reception sensitivity plus the margin are also variable values, which can be obtained preliminary through, for example, experiments.

The simulation results according to another embodiment will now be described with reference to FIG. 16. In the graph of FIG. 16, the vertical axis indicates the interrogation success rate. The graph includes the results for the writing process, in addition to those for the reading process. The interrogation unit typically uses more power when writing data to an RF tag 300 and thus is supplied with more power than when reading data. As a result, the transmission power AR with a high writing success rate is greater than the transmission power AR with a high reading success rate. Although the margin is 6 dBm in FIG. 16, this value is an example and is non-limiting.

The reader/writer 200 is operated using transmission power adjusted separately for the data reading process and for the data writing process. This automatically sets the transmission power determined (adjusted) in the above test mode differently for the data reading process and for the data writing process. In other words, the CPU 241 stores, into the storage unit 270, the transmission power data corresponding to the reading success rate determined for the reading process and the transmission power data corresponding to the writing success rate determined for the writing process, which are determined through the processes in FIGS. 10 to 14 separately as the transmission power data for the reading process in the working mode and the transmission power data for the writing process in the working mode. In the working mode, the CPU 241 adjusts the supply voltage to supply transmission power to the interrogation unit based on the transmission power for the reading process and the transmission power for the writing process stored in the storage unit 270.

The advantages of the other embodiments described above will now be described in association with the issues of the techniques known in the art. The known techniques adjust the transmission power for reading an RF tag and the transmission power for writing to an RF tag at the same time. However, the power supply used to read data from an RF tag differs from the power supply used to write data to an RF tag. More specifically, writing data to an RF tag typically uses more power than reading data from an RF tag. The optimum transmission power for data reading thus differs from the optimum transmission power for data writing. Further, adjusting the transmission power for data writing involves actual writing of data into an RF tag. Such writing is difficult when the system is working or operating. The demand is thus increasing for adjusting the transmission power separately for the reading process and for the writing process.

In the above other embodiments, the data reading process and the data writing process are performed separately in the test mode to adjust (determine) the transmission power separately for the reading process and for the writing process.

The embodiments thus address the issues of the known techniques and satisfy the above demand.

Advantageous Effects of Embodiments

Figure 17:
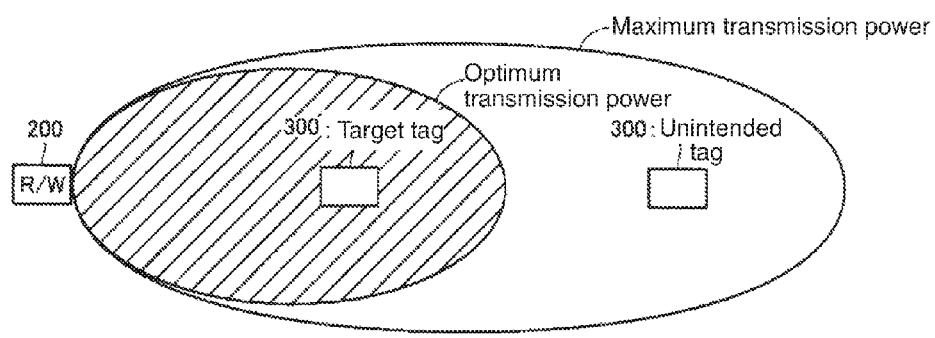
FIG. 17 is a diagram describing the advantageous effects of the embodiments.
Figure 18:
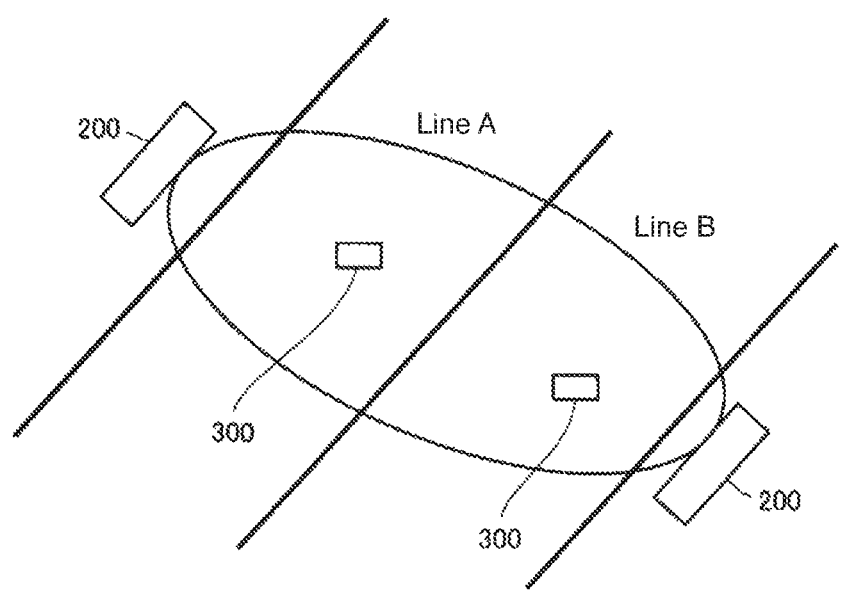
FIG. 18 is a diagram describing the advantageous effects of the embodiments.

FIGS. 17 and 18 are diagrams describing the advantageous effects of the embodiments. In the embodiments, various parameters including the transmission power determined in the test mode are set in the components in the working mode. This allows the reader/writer 200 to interrogate a target RF tag 300 and avoids interrogating an unintended tag as shown in FIG. 17. At production lines, as shown in FIG. 18, each reader/writer 200 interrogates an RF tag 300 transported on a conveyor in a production line to be managed, and excludes an unintended RF tag 300 transported in an adjacent line from its interrogation target.

The embodiments disclosed herein are only illustrative in all respects and should not be construed to be restrictive. The scope of the invention is designated by the appended claims, and it is intended that all changes are contained in the claims and equivalent meanings and ranges.

REFERENCE SIGNS LIST 13 circulator
14 antenna
30 cable
100 device
102 display
104 keyboard
106, 292 memory card
113, 242 timer
200 reader/writer
210 transmission unit
212 modulator
213 power amplifier
216 frequency synthesizer
220 reception unit
221 band pass filter
222 low-noise amplifier
223a, 223b multiplier
223c phase shifter
224 quadrature demodulator
225a, 225b amplifier
240, 331 controller
260 upper interface
270 storage unit
280 display unit
291 interface
300 RF tag
310 antenna
320 impedance adjustment circuit
332 semiconductor memory

The invention claimed is:

1. An interrogation device, comprising:
an interrogation unit interrogating an RF tag in a contactless manner, the interrogation unit having a plurality of channels for interrogation; and
a controller configured with a program to control the interrogation unit, wherein the controller is configured with the program to perform operations comprising:
for each channel,
causing the interrogation unit to transmit a signal with a transmission power, a value of the transmission power being changed in stages;
obtaining, for each value of the changed transmission power, a signal strength value and an interrogation success rate from a reception signal received by the interrogation unit;
selecting a value of the changed transmission power corresponding to a signal strength value determined to be not less than a threshold selected from the signal strength values obtained for each stage of the changed transmission power or an interrogation success rate that is not less than a threshold selected from interrogation success rates obtained for each stage of the changed transmission power; and
outputting information about the selected value of the changed transmission power.

2. The interrogation device according to claim 1, wherein the controller changes the value of the transmission power between a predetermined minimum value and a predetermined maximum value.

3. The interrogation device according to claim 2, wherein when the transmission power is changed to the maximum value, the controller outputs a warning in response to an interrogation success rate that is less than the threshold selected from the interrogation success rates.

4. The interrogation device according to claim 2, wherein when the transmission power is changed between the minimum and the maximum value, the controller outputs a warning in response to an interrogation success rate that has changed by a degree falling within a predetermined range.

5. The interrogation device according to claim 1, further comprising:
an antenna unit; and
a power filter cutting a reception signal with power that is less than a filter threshold selected from reception signals output from the antenna unit, wherein
the controller determines reception power of a received signal as the filter threshold for the power filter.

6. The interrogation device according to claim 1, wherein the interrogation unit separately interrogates a plurality of RF tags located at different positions; and
the controller is configured with the program to perform operations further comprising selecting a value of the changed transmission power for each RF tag while switching the RF tags to be interrogated by the interrogation unit.

7. The interrogation device according to claim 1, wherein the interrogation success rate includes a reading success rate indicating a rate of successful reading of data from the RF tag, and a writing success rate indicating a rate of successful writing of data to the RF tag; and
the controller is configured with the program to perform operations such that selecting the value of the changed transmission power corresponding to the interrogation success rate that is not less than the threshold selected from the interrogation success rates obtained in each stage of the changed transmission power comprises:
selecting a value of the changed transmission power corresponding to a reading success rate that is not less than a threshold selected from reading success rates obtained in each stage of the changed transmission power;
selecting a value of the changed transmission power corresponding to a writing success rate that is not less than a threshold selected from writing success rates obtained in each stage of the changed transmission power;

storing the selected value of the changed transmission power corresponding to the reading success rate as a transmission power for a reading process in a working mode; and storing the selected value of the changed transmission power corresponding to the writing success rate as a transmission power for a writing process in the working mode.

8. A system comprising:
an interrogation device; and
a host device, wherein
the interrogation device comprises:
   an interrogation unit interrogating an RF tag in a contactless manner, the interrogation unit having a plurality of channels for interrogation; and
   a controller configured with a program to control the interrogation unit, wherein the controller is configured with the program to perform operations comprising:
   for each channel,
      causing the interrogation unit to transmit a signal with a transmission power, a value of the transmission power being changed in stages;
      obtaining, for each value of the changed transmission power, a signal strength value and an interrogation success rate from a reception signal received by the interrogation unit;
      selecting a value of the changed transmission power corresponding to a signal strength value determined to be not less than a threshold selected from the signal strength values obtained for each stage of the changed transmission power or an interrogation success rate that is not less than a threshold selected from the interrogation success rates obtained for each stage of the changed transmission power; and
      outputting information about the selected value of the changed transmission power.

9. A non-transitory computer-readable medium storing instructions to enable an interrogation device to implement an interrogation method, the interrogation device comprising:
an interrogation unit configured interrogating an RF tag in a contactless manner, the interrogation unit having a plurality of channels for interrogation; and
a processor; wherein
the stored instructions when executed by the processor cause the processor to perform operations of the interrogation method, the operations comprising:
for each channel,
   causing the interrogation unit to transmit a signal with a transmission power, a value of the transmission power being changed in stages;
   obtaining, for each value of the changed transmission power, a signal strength value and an interrogation success rate from a reception signal received by the interrogation unit;
   selecting a value of the changed transmission power corresponding to a signal strength value that is not less than a threshold selected from the signal strength values obtained for each stage of the changed transmission power or an interrogation success rate that is not less than a threshold selected from the interrogation success rates obtained for each stage of the changed transmission power; and
   outputting information about the selected value of the changed transmission power.

10. The non-transitory computer-readable medium according to claim 9, wherein the instructions cause the processor to perform operations such that causing the interrogation unit to transmit a signal with a transmission power, a value of the transmission power being changed in stages comprises causing the interrogation unit to transmit a signal with a transmission power, a value of the transmission power being changed between a predetermined minimum value and a predetermined maximum value.

11. The non-transitory computer-readable medium according to claim 10, wherein the instructions cause the processor to perform operations further comprising outputting, in a condition in which the value of the transmission power is changed to the predetermined maximum value, a warning in response to an interrogation success rate that is less than the threshold selected from the interrogation success rates.

12. The non-transitory computer-readable medium according to claim 10, wherein the instructions cause the processor to perform operations further comprising outputting, in a condition in which the value of the transmission power is changed between the predetermined minimum value and the predetermined maximum value, a warning in response to an interrogation success rate that has changed by a degree falling within a predetermined range.

13. The non-transitory computer-readable medium according to claim 9, wherein
the interrogation unit comprises an antenna unit and a power filter; and
the instructions cause the processor to perform operations further comprising cutting a reception signal with power that is less than a filter threshold selected from reception signals output from the antenna unit, wherein the reception power of a received signal is set as the filter threshold for the power filter.

14. The non-transitory computer-readable medium according to claim 9, wherein
the interrogation unit separately interrogates a plurality of RF tags located at different positions; and
the instructions cause the processor to perform operations such that selecting a determined transmission power comprises selecting a determined transmission power for each RF tag while switching the RF tags to be interrogated by the interrogation unit.

15. The non-transitory computer-readable medium according to claim 9, wherein
the interrogation success rate includes a reading success rate indicating a rate of successful reading of data from the RF tag, and a writing success rate indicating a rate of successful writing of data to the RF tag; and
the instructions cause the processor to perform operations such that selecting a value of the changed transmission power corresponding to a signal strength value that is not less than a threshold selected from the signal strength values obtained in each stage of the changed transmission power or an interrogation success rate that is not less than a threshold selected from the interrogation success rates obtained in each stage of the changed transmission power comprises:
selecting a value of the changed transmission power corresponding to a reading success rate that is not less than a threshold selected from reading success rates obtained in each stage of the changed transmission power;

selecting a value of the changed transmission power corresponding to a writing success rate that is not less than a threshold selected from writing success rates obtained in each stage of the changed transmission power;

storing the selected value of the changed transmission power corresponding to the reading success rate as a transmission power for a reading process in a working mode; and storing the selected value of the changed transmission power corresponding to the writing success rate as a transmission power for a writing process in the working mode.

* * * * *